(12) United States Patent
Ralston (10) Patent No.: US 11,156,257 B1
(45) Date of Patent: Oct. 26, 2021

(54) INBOARD BRAKE SYSTEM

(71) Applicant: Ivan Ralston, Ottawa (CA)

(72) Inventor: Ivan Ralston, Ottawa (CA)

( * ) Notice: Subject to any disclaimer, the term of this patent is extended or adjusted under 35 U.S.C. 154(b) by 0 days.

(21) Appl. No.: 17/225,370

(22) Filed: Apr. 8, 2021

(30) Foreign Application Priority Data

Apr. 8, 2020 (CA) .................................... 3077918

(51) Int. Cl.
| | |
|---|---|
| *F16D 65/847* | (2006.01) |
| *B60T 5/00* | (2006.01) |
| *F16D 66/00* | (2006.01) |
| *F16D 65/78* | (2006.01) |

(52) U.S. Cl.
CPC .............. *F16D 65/847* (2013.01); *B60T 5/00* (2013.01); *F16D 2065/783* (2013.01); *F16D 2066/001* (2013.01)

(58) Field of Classification Search
CPC ............. F16D 65/847; F16D 2066/001; F16D 2065/783; B60T 5/00
See application file for complete search history.

(56) References Cited

U.S. PATENT DOCUMENTS

| | | | | |
|---|---|---|---|---|
| 4,440,270 | A  * | 4/1984 | Ross ..................... | F16D 65/847 188/264 AA |
| 6,357,563 | B1 * | 3/2002 | Hayford ................ | F16D 65/847 188/264 A |
| 6,446,766 | B1 * | 9/2002 | Cornolti ................ | F16D 55/228 188/264 A |
| 7,353,919 | B2 * | 4/2008 | Christ ................... | F16D 55/224 188/264 A |
| 7,963,376 | B2 * | 6/2011 | Gelb .................... | F16D 65/0031 188/264 AA |
| 8,448,753 | B2 * | 5/2013 | Petrini .................. | F16D 65/847 188/71.6 |
| 9,400,025 | B2 * | 7/2016 | Maestrini ............. | F16D 65/847 |
| 2014/0239121 | A1 * | 8/2014 | Kirkbride ................ | B60T 5/00 244/103 R |
| 2020/0124123 | A1 * | 4/2020 | Elogab ..................... | B60T 5/00 |

* cited by examiner

*Primary Examiner* — Pamela Rodriguez
(74) *Attorney, Agent, or Firm* — Notaro, Michalos & Zaccaria P.C.

(57) ABSTRACT

An inboard braking system for a vehicle is disclosed, having a brake assembly with an optimal braking temperature range, a brake assembly enclosure substantially enclosing the brake assembly and defining an air inlet and an air outlet, and an air-cooling system for cooling the brake assembly. The air-cooling system and brake assembly enclosure form an airflow path through which air can flow from one or more air intakes through the brake assembly enclosure to one or more air vents.

36 Claims, 4 Drawing Sheets

INBOARD BRAKE SYSTEM

FIELD

The present invention relates to the field of brakes for vehicles, and more particularly to inboard brakes.

BACKGROUND

Disk brakes are commonly used for slowing or stopping the rotation of a wheel of a vehicle. Disk brake assemblies generally include a rotor physically connected to a wheel of a vehicle, and a caliper. The caliper houses brake pads on either side of the rotor and is operable to move the brake pads into frictional contact with the rotor to slow or stop the rotation of the wheel. The calipers can be actuated by any number of actuators such as but not limited to hydraulic actuators, pneumatic actuators, mechanical linkage actuators, and electromagnetic actuators.

Modern vehicles typically have the brakes mounted to the wheels, but some vehicles throughout history have employed inboard brakes. Inboard brakes are brakes mounted "inboard" in relation to the wheels of a vehicle, for example on an axle that is connected to the wheels. Inboard brakes have many advantages stemming primarily from the redistribution of mass within the vehicle.

The weight of a vehicle can be viewed as being distributed between sprung weight, semi-sprung weight, and unsprung weight. The unsprung weight of a vehicle is the portion of the weight of a vehicle that is fixed to the suspension rather than being supported by the suspension. Sprung weight is the portion of the weight of a vehicle that is supported by the suspension. Semi-sprung weight is the portion of the vehicle that is partially supported by the suspension.

It is well known that reducing the unsprung weight of a vehicle is beneficial to its handling, particularly on uneven driving surfaces. When a wheel is subject to a bump in the driving surface, the wheel is accelerated upward. The suspension must then exert a contrary force to overcome the wheel's upward momentum and to restore a maximum pressure between the wheel and the road surface as quickly as possible. Increased pressure between the tire and the driving surface creates greater the friction between the tire and the driving surface, thus resulting in better handling for the vehicle. Reducing the unsprung weight reduces the mass that must be accelerated downward, thus improving the effectiveness with which the suspension can return the wheel to the driving surface and/or to a maximum pressure between the tire and the driving surface.

Brakes are generally mounted inside the rims of each of the wheels of a vehicle, forming part of the unsprung weight of the vehicle. Moving the brakes to an inboard position shifts the weight of the brake system to the sprung weight, thus reducing the unsprung weight of the vehicle and improving its handling.

Further, having the brakes mounted inboard of the wheel enables the use of smaller, lighter wheels. This, in turn, further reduces the unsprung weight of the vehicle, and further improves the vehicle's handling.

Moving the brake assembly inboard can also have the benefit of reducing the rotational mass of the vehicle. Rotational mass is the portion of the mass of a vehicle which must be accelerated rotationally when the vehicle accelerates. Rotational mass must be accelerated twice when the vehicle accelerates: once linearly as the vehicle accelerates in a direction, and once rotationally. Non-rotational mass must only be accelerated once. As such, rotational mass has a greater impact on the acceleration capability and the fuel economy of a vehicle than non-rotational mass. Reducing the rotational mass of a vehicle also reduces its moment of inertia, thus reducing the amount of torque required for angular acceleration and improving fuel economy.

Moving the brakes inboard can also indirectly enable the further reduction of unsprung weight and rotational mass. Having the brakes mounted inboard of the wheel enables the use of smaller, lighter wheels and appropriately smaller and lighter wheel hardware. Such a size reduction reduces the rotational mass and the moment of inertia of the vehicle, thus improving the vehicle's performance and fuel economy.

The benefits of reduced unsprung weight, rotational mass and moment of inertia are particularly well known in the racing industry.

One of the biggest challenges in transitioning from outboard to inboard brakes has been heat management. The overheating of brakes reduces performance, increases maintenance costs, and can pose a safety risk.

Brakes have an operating temperature range having a minimum operating temperature and a maximum operating temperature. The operating temperature range depends primarily on the design and composition of the rotors and the pads, but the operating temperature range of brakes is typically hotter than environmental air. For example, the operating temperature range of some racing brake pads is between 300° C. to and 800° C. On the other hand, the typical non-racing steel brakes found on most consumer vehicles can begin to overheat at temperatures as low as 200° C.

Brakes operated at a temperature above or below the operating temperature range suffer from a significant loss of stopping power. In the case of overheating, the loss of performance can be almost complete, and therefore poses a serious safety risk. Overheating can also cause damage to the braking system such as damaging the overheated components of the brake assembly and boiling its brake fluid. Further, when brakes overheat, they can release gasses. These gasses can be caught between the friction elements of the braking system, thus decreasing the stopping power of the brakes.

Overcooling can affect brakes of consumer vehicles in the winter, but overcooling is a more significant issue for performance vehicles, whose brakes tend to minimum operating temperatures of many hundreds of degrees Celsius. Where such performance brakes are in use, maintaining the temperature of the brakes between braking events can be a challenge.

Many modern disk brake rotors have been adapted to reduce the likelihood of overheating, as well as to reduce the effects of overheating. Some brake rotors are vented such that there are air channels running through them. As they rotate, air is drawn into the air channels near the center of the rotor and exhausted at the outer edge, thus cooling the rotor. Some brake rotors have grooves in their friction surface. If the brakes overheat and gasses evolve at the surface of the grooved rotor, the gasses can escape through the grooves rather than being trapped between the brake pad and the rotor, where they would reduce the friction between the pad and the rotor. In this way, the deleterious effects of overheating can be reduced.

Brakes also have an optimal braking temperature range, within which the brakes generally provide the most stopping power. The optimal braking temperature range is typically a subset of the brakes' operating temperature range.

For many brakes, the stopping power increases with temperature until the brakes overheat. Thus, for such brakes, the optimal braking temperature range often abuts the maximum operating temperature. Some brakes can have optimal braking temperature ranges that are not near the maximum operating temperature due to the materials from which they are formed and their manufacturing.

Given the inboard mounting location, inboard brakes are not naturally exposed to large amounts of cool airflow like traditional outboard brakes, so cooling has historically been an impediment to their widespread adoption and use.

SUMMARY

The present disclosure provides an inboard braking system for a vehicle, comprising a brake assembly having an optimal braking temperature range, a brake assembly enclosure substantially enclosing the brake assembly, the brake assembly defining an air inlet and an air outlet, and an air-cooling system. The air-cooling system comprises one or more air intakes located at one or more high-pressure regions of a body of the vehicle, in fluid connection with the air inlet of the brake assembly enclosure. The air-cooling system further comprises one or more air vents located at one or more low-pressure regions of the body of the vehicle, in fluid connection with the air outlet of the brake assembly enclosure. The one or more air intakes, the air inlet, the brake assembly enclosure, the air outlet, and the one or more air vents form an airflow path through which air can flow from the one or more air intakes, through the brake assembly enclosure, to the one or more air vents.

In some embodiments, the brake assembly of the inboard braking system is mounted to a rotational member.

In some embodiments, the rotational member is an axle of the vehicle.

In some embodiments, the brake assembly further comprises at least one brake rotor fixed to the rotational member, at least one caliper corresponding to each of the at least one rotors, and at least one set of brake pads corresponding to each of the at least one calipers. Each set of brake pads is housed within the corresponding one of the at least one calipers, and the brake pads of the corresponding set of brake pads are disposed opposite one another on opposite sides of the corresponding one of the at least one brake rotors. In such embodiments, the action of each of the at least one calipers causes the corresponding one of the at least one sets of brake pads to engage the corresponding one of the at least one brake rotors in frictional contact.

In some embodiments, the at least one brake rotors are at least one of vented, grooved and drilled brake rotors.

In some embodiments, the air intake is fluidly connected to the air inlet by a first ducting and the air outlet is fluidly connected to the air vent by a second ducting.

In some embodiments, the air-cooling system further comprises an air diffuser disposed between the air inlet of the brake assembly enclosure and the brake assembly.

In some embodiments, the inboard braking system of the present disclosure further comprises an airflow control subsystem comprising one or more controllable valves and a vale controller adapted to control the one or more controllable valves.

In some embodiments, the airflow control subsystem further comprises a temperature sensor in thermal communication with the brake assembly and in operable communication with the valve controller.

In some embodiments, the valve controller controls the one or more controllable valves according to the temperature of the brake assembly and the optimal braking temperature range of the brake assembly.

In some embodiments, the valve controller opens the one or more controllable valves when the temperature of the brake assembly is approximately the upper limit of the optimal braking temperature range of the brake assembly or hotter.

In some embodiments, the valve controller closes the one or more controllable valves when the temperature of the brake assembly is approximately the lower limit of the optimal braking temperature range of the brake assembly or colder.

In some embodiments, the valve controller is a bi-metal bar that is in thermal communication with the brake assembly and adapted to flex according to the temperature of the brake assembly, and the one or more controllable valves are controlled by a flexing action of the bi-metal bar.

In some embodiments, the valve controller is a computer.

In some embodiments, the valve controller is a computer adapted to open the one or more controllable valves when the computer predicts that the temperature of the brake assembly is likely to reach or exceed the upper limit of the optimal braking temperature range.

In some embodiments, the valve controller is a computer adapted to close the one or more controllable valves when the computer predicts that the temperature of the brake assembly will reach or fall below the lower limit of the optimal braking temperature range.

In some embodiments, the inboard braking system of the present disclosure comprises a brake heating subsystem comprising one or more heaters and a heater controller adapted to control the one or more heaters.

In some embodiments, the inboard braking system of the present disclosure comprises a temperature sensor in thermal communication with the brake assembly and in operable communication with the heater controller.

In some embodiments, the heater controller controls the one or more heaters according to the temperature of the brake assembly and the optimal braking temperature range of the brake assembly.

In some embodiments, the heater controller activates the one or more heaters when the temperature of the brake assembly is at or below the lower limit of the optimal braking temperature range.

In some embodiments, the heater controller is a bi-metal bar that is in thermal communication with the brake assembly and adapted to flex according to the temperature of the brake assembly, and wherein the one or more heaters are controlled by the flexing of the bi-metal bar.

In some embodiments, the heater controller is a computer.

In some embodiments, the heater controller is a computer adapted to activate the one or more heaters when the computer predicts that the temperature of the brake assembly will reach or fall below the lower limit of an optimal braking temperature range of the brake assembly.

In some embodiments, the computer is adapted to receive sensor information, and further adapted to use the sensor information to predict a future temperature of the brake assembly.

In some embodiments, the inboard braking system of the present disclosure comprises a forced air subsystem comprising one or more blowers and a blower controller adapted to control the one or more blowers.

In some embodiments, the inboard braking system of the present disclosure comprises a temperature sensor in thermal communication with the brake assembly and in operable communication with the heater controller.

In some embodiments, the inboard braking system of the present disclosure comprises an airflow sensor disposed along the airflow path of the air-cooling system and in operable communication with the blower controller.

In some embodiments, the blower controller controls the one or more blowers in accordance with the temperature of the brake assembly and the optimal braking temperature range of the brake assembly.

In some embodiments, the blower controller controls the one or more blowers in accordance with an airflow of the air-cooling system and the optimal braking temperature range of the brake assembly.

In some embodiments, the airflow sensor is selected from the list of: a moving vane meter, a hot wire sensor, a coldwire sensor, a Kármán vortex sensor, and a membrane sensor.

In some embodiments, the inboard braking system of the present disclosure comprises two or more of: an airflow control subsystem comprising one or more controllable valves and an valve controller; a forced air subsystem comprising one or more blowers and a blower controller; and a brake heating subsystem comprising one or more heaters and a heater controller. Such embodiments further comprise a single master controller, the master controller being two or more of: the valve controller, the blower controller, and the heater controller. The master controller is adapted to control the two or more subsystems to maintain a temperature of the brake assembly within an optimal braking temperature range.

In some embodiments, the master controller is a computer.

In some embodiments, the master controller is a bi-metal bar in thermal communication with the brake assembly such that the bi-metal bar flexes according to the temperature of the brake assembly, and wherein the flexing action of the bi-metal bar controls the two or more subsystems.

In some embodiments, the bi-metal bar is adapted to actuate one or more switches which are each in operable connection with one or more of the two or more subsystems.

BRIEF DESCRIPTION OF THE DRAWINGS

The present invention will be better understood in connection with the following FIGURES in which.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

General

It is contemplated that the present invention provides a brake system comprising a brake assembly, a brake assembly enclosure, and an air-cooling system. The brake assembly can include any known braking system that employs friction to slow or stop a rotational movement of a rotational element of a vehicle.

In some embodiments, the brake assembly is a drum brake assembly. In some embodiments the brake assembly is a disc brake assembly. The disk brake assembly comprises at least one caliper, each of which houses a pair of opposing brake pads. Each pair of brake pads is disposed on opposite sides of a corresponding brake rotor that is fixed to the rotational element of the vehicle.

The brake assembly, whether it is a drum brake, disc brake or another known type of brake, has an operating temperature range in which it is designed to operate. Within the operating temperature range is an optimal temperature range, within which the brakes generally provide the most stopping power. The operating and optimal temperature ranges vary depending on the particular type of brake assembly and the materials of which the brake assembly and its components are made. For example, in some embodiments, the optimal braking temperature range can be a very narrow range of temperatures where the brakes, by their nature, operate best in a very narrow temperature range or where peak performance is important (such as in the case of a racing vehicle). In other embodiments, the optimal braking temperature range can be substantially the same as the operating temperature range of the brake assembly.

In some embodiments, the rotational element of the vehicle, to which a rotor of the brake assembly is attached, is an axle of the vehicle. In such embodiments, the brake assembly can be mounted axially removed from a wheel.

Brake Rotors

It will be appreciated by someone skilled in the art that the one or more brake rotors can each be of any suitable design and can be manufactured from any suitable material. For example, the one or more rotors can be solid, vented, grooved, drilled, or a combination thereof.

The brake rotor can be manufactured wholly or partially of non-metallic materials such as cellulose, asbestos, aramid, polyacrylonitrile, phenolic resin, graphite, vermiculite, whiting, rubber, sand, aramid fibres, zirconium silicate, sintered glass, and ceramic; or of metallic materials such as bronze powder, steel, copper, tungsten, and magnesium.

Brake Calipers

An action of each of the at least one calipers moves a corresponding pair of brake pads into frictional contact with a corresponding brake rotor, thus creating friction and braking the rotational element to which the rotor is fixed.

It is contemplated that the at least one calipers can be actuated in any suitable way, such as, for example, by a hydraulic system, a pneumatic system, or an electromechanical system.

Brake Assembly Enclosure

The brake assembly is substantially enclosed by a brake assembly enclosure. The brake assembly enclosure can be made of any suitable material such as metal, plastic, or synthetic material.

In some embodiments, the brake assembly enclosure comprises two or more brake assembly enclosure sections in order to facilitate removal and replacement.

In some embodiments, the brake assembly enclosure can be insulated.

In some embodiments, the brake assembly enclosure can be reinforced to better withstand impacts from rocks, ice, and other hazards.

Air-Cooling System: General

The air-cooling system comprises one or more air intakes into which environmental air enters the air-cooling system. The one or more air intakes is in fluid connection with an air inlet of the brake assembly enclosure. In this way, environmental air is directed from the one or more air intakes to the inside of the brake assembly enclosure. The brake assembly enclosure further comprises an air outlet in fluid connection with one or more air vents by way of which the air can exit the air-cooling system.

It is contemplated that environmental air enters the brake assembly enclosure by way of the air inlet, then passes over the brake assembly, exits the brake assembly enclosure at the air outlet, and then exits the air-cooling system by way of the one or more air vents. In this way, the air passes through the brake assembly enclosure, cooling the brake assembly. In some embodiments, air passes over both the front and back sides of the rotor, and passes through the vents of a vented rotor.

In some embodiments, the one or more air intakes is located at a high-pressure area of a body of a vehicle. This is an area of the vehicle's body that, when the vehicle is in motion, experiences higher than atmospheric air pressure. An example of a high-pressure area is the front grill of an automobile. Similarly, the air vent is located at a low-pressure area of the body of the vehicle, which is an area that experiences air pressure lower than that experienced at the high-pressure area when the vehicle is in motion. An example of a low-pressure area is the exhaust outlet of the vehicle. In such embodiments, the movement of the air through the air-cooling system is driven by the pressure difference between the intake and the vent.

It is contemplated that in this way, the air-cooling system defines an airflow path for environmental air consisting of entry through the one or more air intakes, transmission to the air inlet of the brake assembly enclosure, flow through the brake assembly enclosure to the air outlet, and transmission to the one or more air vents at which point the air exits the air-cooling system. Transmission between the one or more air intakes and the air inlet can be accomplished by ducting. Transmission from the air outlet to the one or more air vents can be accomplished by ducting.

Air-Cooling System: Diffuser

In some embodiments, the air-cooling system further comprises an air diffuser disposed between the air inlet of the brake assembly enclosure, and the brake assembly.

The air diffuser better distributes the environmental air entering the brake assembly enclosure throughout the brake assembly enclosure.

In some embodiments, the diffuser is a round plate disposed between the air inlet of the brake assembly enclosure and the brake rotor of the brake assembly, and parallel to the brake rotor. The diffuser has holes that allow airflow to pass through the diffuser at designated locations, to direct airflow to desired areas of the brake rotor. For example, holes in the diffuser can be lined up with holes formed in a vented brake rotor. The diffuser plate can be mounted in place using any effective means that will not interrupt air flow from the air inlet, through the diffuser, to the brake rotor. For example, the diffuser plate can be held in place by a plurality of support arms extending from the edges of the diffuser plate to the walls of the b rake assembly enclosure.

In some embodiments, the diffuser is a fin adapted to direct airflow to the back of the brake rotor relative to the air inlet. The fin diffuser can be mounted in a suitable place in a substantially similar manner to the plate diffuser.

The diffuser can be manufactured of any suitable material such as metal or ceramic.

Air-Cooling System: Valves

In some embodiments, the inboard brake system further comprises an airflow control subsystem comprising one or more controllable valves which are operable to block or restrict the flow of air through the air-cooling system. The one or more controllable valves can be disposed anywhere along the fluid path of the air-cooling system.

The one or more valves can be closed by default and controllably opened only when airflow is desired, or open by default and controllably closed when the restriction of airflow is desired.

It is contemplated that the one or more controllable valves can be any type suitable for restricting or blocking air flow through the air-cooling system. Examples of suitable valve types include but are not limited to ball valves, butterfly valves, actionable check valves, gate valves, plug valves, solenoid valves, and throttles. The one or more controllable valves can be of a type that causes minimal pressure drop.

In some embodiments the one or more controllable valves are controlled by a valve controller, but the valves can also be manually operated.

The valve controller can be any suitable controller for the chosen valve type. For example, a computer of the vehicle can serve as a valve controller where the controllable valves are electrically controllable. The computer can be an existing computer of a vehicle. The valve controller can be a mechanical device where the valves are not electrically controllable.

The controller controls the valves to control air flow through the air-cooling system, with a view to maintaining a brake assembly temperature within the optimal braking temperature range. For example, when a brake assembly temperature approaches an upper limit of an optimal braking temperature range, the valve controller can open all of the one or more valves, thus permitting environmental air to enter the brake assembly enclosure to cool the brakes.

In some embodiments, the valve controller is adapted to close the controllable valves in order to preserve heat in the brake assembly if the temperature of the brake assembly is cooling and approaching the lower limit of the optimal braking temperature range.

In some embodiments, the mechanical device acting as the valve controller is a bi-metal bar. The bi-metal bar is in thermal communication with the brake assembly and is operably connected to one or more controllable valves. When the brake assembly heats up, the bi-metal bar is heated according to a temperature of the brake assembly and flexes according to the temperature of the brake assembly. The flexing action of the bi-metal bar according to a temperature of the brake assembly controls the one or more controllable valves either directly or indirectly. For example, the flexing action of the bi-metal bar can activate a switch which opens or closes the one or more controllable valves.

In some embodiments, the one or more controllable valves are throttles, and the throttles can be opened partially according to the temperature of the brake assembly.

In some embodiments, the valve controller is a computer. It is contemplated that the computer is adapted to open the one or more controllable valves when a temperature of the brake assembly approaches an upper limit of the brake assembly's optimal braking temperature range. In some embodiments, the inboard brake system further comprises a temperature sensor in operable communication with the computer.

It is contemplated that the computer can be further adapted to open the controllable valves when overheating relative to the upper limit of the optimal braking temperature is predicted based on information available to the computer.

Information available to the computer includes metrics that the computer receives and metrics that the computer calculates based on received metrics, such as the temperature of the brake assembly, a calculated rate of increase of temperature of the brake assembly, a speed of the vehicle, an acceleration or deceleration of a vehicle, positional and environmental information about the vehicle and its surroundings, and a mass of the vehicle.

In one embodiment, a first controllable throttle is disposed at the air inlet of the brake assembly enclosure and a second controllable throttle is disposed at the air outlet of the brake assembly enclosure.

Air-Cooling System: Heater

In some embodiments, the inboard brake system further comprises a brake heating subsystem. The brake heating subsystem comprises one or more heaters which heat the brake assembly either directly or indirectly.

The one or more heaters can be any type of heater suitable for heating the brake assembly, either directly or indirectly, for example by heating the air within the brake assembly enclosure or the air entering via the air inlet. Examples of suitable heaters include electric resistive heaters, chemical, or combustion.

It is contemplated that the heater can be an existing component of the vehicle, such as a combustion engine or a cabin air heating system. When such existing components are used, a suitable heat transport system is needed to transport heat from the component to the brake assembly. By way of example, heated engine coolant can be circulated through piping in contact with the brake assembly enclosure, thereby heating the enclosure and the air within. As another example, heated air from the cabin air heating system can be directed into the brake assembly enclosure via air ducts, heating the brake assembly within.

In some embodiments, the one or more heaters are electric resistive heating coils in thermal contact with the brake assembly to directly heat the brake assembly. In some embodiments, the one or more heaters are electric resistive heating coils in thermal contact with the air within the brake assembly enclosure. In this way, the one or more heaters heats the air within the brake assembly enclosure, and the heated air heats the brake assembly.

In some embodiments, the brake heating subsystem is controlled by a heater controller. The heater controller can be any suitable controller, such as, for example, a computer or a mechanical controller such a bi-metal bar that activates a switch when a pre-defined temperature is reached. It is contemplated that the heater can be manually operated. The heater controller controls the heater according to a temperature of the brake assembly to maintain the temperature of the brake assembly within an optimal braking temperature range.

Forced Air Subsystem

In some embodiments, the inboard brake system further comprises a forced air subsystem, comprising one or more controllable blowers disposed to force air through the airflow path formed by the air-cooling system and brake assembly enclosure, thus providing improved airflow. Improved airflow may be desired in circumstances where the natural high- and low-pressure zones at which the one or more air intakes and the one or more air vents are located do not create sufficient airflow, for example, where the air intake(s) and vent(s) are mounted to a body of a vehicle and the vehicle is moving too slowly for the natural aerodynamic high- and low-pressure zones on the body of the vehicle to create the airflow necessary to adequately cool the brake assembly.

The one or more controllable blowers can be any type of blower suitable for forcing air through the air flow path formed by the air-cooling system and the brake assembly enclosure.

It is contemplated that the one or more controllable blowers can be an existing component of a vehicle such as a cabin air blower. In this case, ducting can be provided to provide an air path whereby air moved by the cabin air blower moves into and through the air-cooling system.

In some embodiments, the controllable blower is controlled by a blower controller. The blower controller can be any suitable controller. In some embodiments, the blower controller is a computer of a vehicle.

In some embodiments, the forced air subsystem further comprises one or more airflow sensors operably disposed about an airflow path of the air-cooling system and the blower controller controls the blower according to an airflow measured at the one or more airflow sensors and a temperature of the brake assembly. The one or more airflow sensors can be any suitable type, including but not limited to: a moving vane meter, a hot wire sensor, a cold wire sensor, a Kármán vortex sensor, and a membrane sensor.

In some embodiments the blower controller is in operable connection with a temperature sensor which is in thermal communication with the brake assembly. The temperature sensor can be mounted in any appropriate way such that it is in thermal communication with the brake assembly. In one embodiment, the temperature sensor is mounted in the brake fluid reservoir behind the caliper piston. In such embodiments, the forced air subsystem can work in co-operation with the brake heating subsystem, to heat or cool the brake assembly as required to maintain the temperature of the brake assembly within the optimal temperature range.

Subsystem Controller

In some embodiments, the inboard brake system further comprises two or more subsystems of: an airflow control subsystem having an airflow controller, a brake heating subsystem having a heater controller, and a forced air subsystem having a blower controller.

In such embodiments a single subsystem controller is provided which acts as the corresponding two or more of: valve controller, heater controller, and blower controller. In some embodiments, the subsystem controller controls the two or more subsystems according to a temperature of the brake assembly, in order to maintain the temperature within the optimal braking temperature range of the brake assembly. The subsystem controller can be a computer or a mechanical device.

In some embodiments, the subsystem controller is a device comprising a bi-metal bar in thermal communication with the brake assembly and adapted to control the two or more subsystems.

For example, in an embodiment wherein the two or more subsystems comprise a brake heating subsystem and an airflow control subsystem, the flexing motion of the bi-metal bar, which flexes according to a temperature of the brake assembly, can operate two switches. In some embodiments, the bi-metal bar is positioned relative to one or more switches of one or more blowers such that a flexing action of the bi-metal bar can actuate the one or more switches, thus turning the one or more blowers on or off according to a temperature of the brake assembly.

In this way, when the brake assembly reaches a minimum optimal braking temperature, the bi-metal bar will activate a first switch which closes the one or more valves of the airflow control subsystem as well as a second switch which engages a heater of the brake heating subsystem. The first and second switches need not be activated at the same temperature. For example, there may be a temperature range in which the valves are closed to retain heat, but the heater is not engaged.

In a different embodiment, the subsystem controller is a computer adapted to control the two or more subsystems of the inboard brake system. The controller is adapted to control the two or more subsystems to maintain a brake assembly temperature within an optimal braking temperature range.

Figure 1:
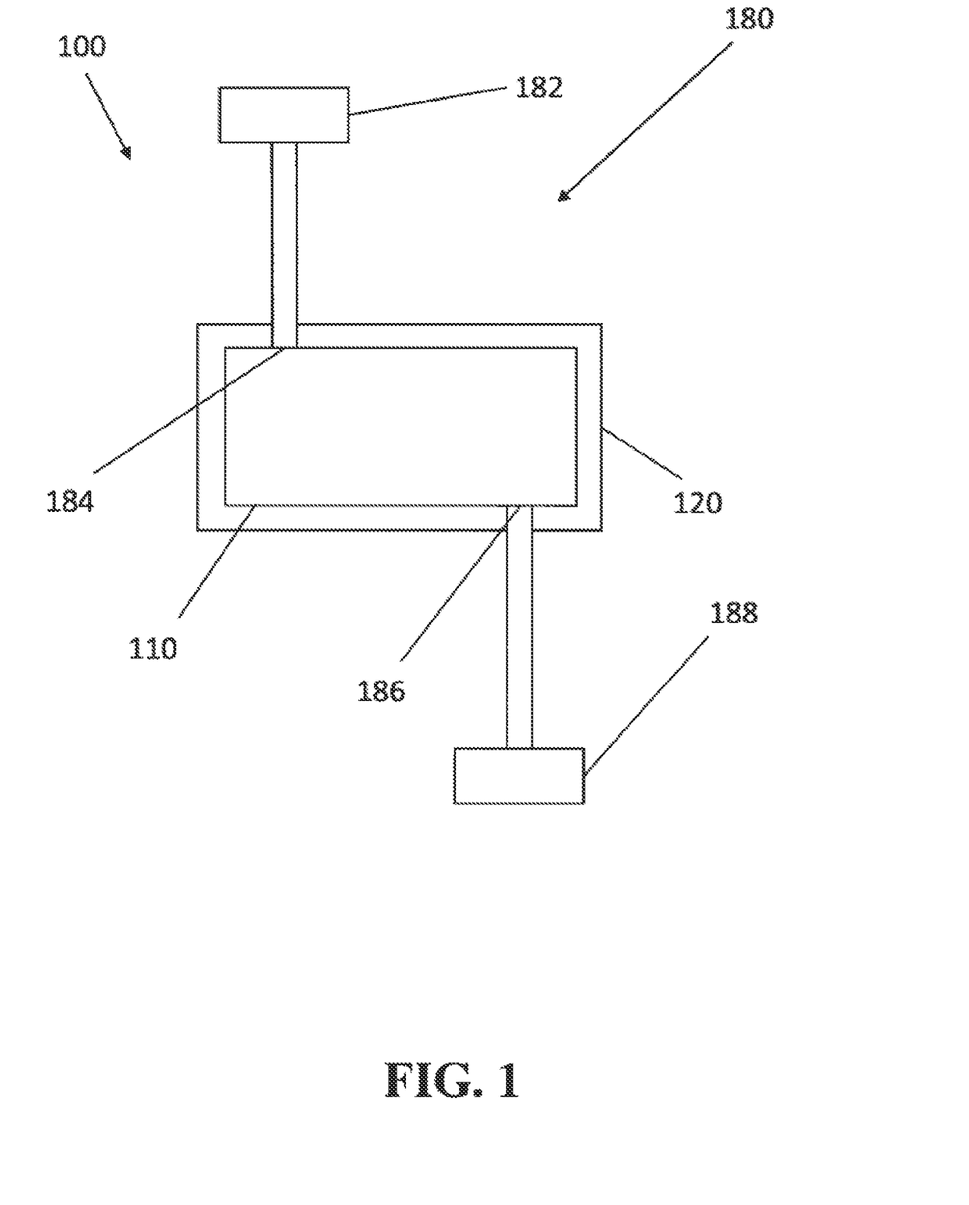
FIG. 1 is a diagram of an inboard brake system according to one embodiment.

Turning to FIG. 1, a diagram of inboard brake system 100 is illustrated according to one embodiment. Inboard brake system 100 comprises air-cooling system 180 and brake assembly 110, which is enclosed by brake assembly enclosure 120.

Air-cooling system 180 comprises air intake 182, air inlet 184 of brake assembly enclosure 120, air outlet 186 of brake assembly enclosure 120, and air vent 188. Air intake 182 is disposed at a high-pressure region of a body of a vehicle. Air vent 188 is disposed at a low-pressure area of a body of a vehicle.

Figure 2:
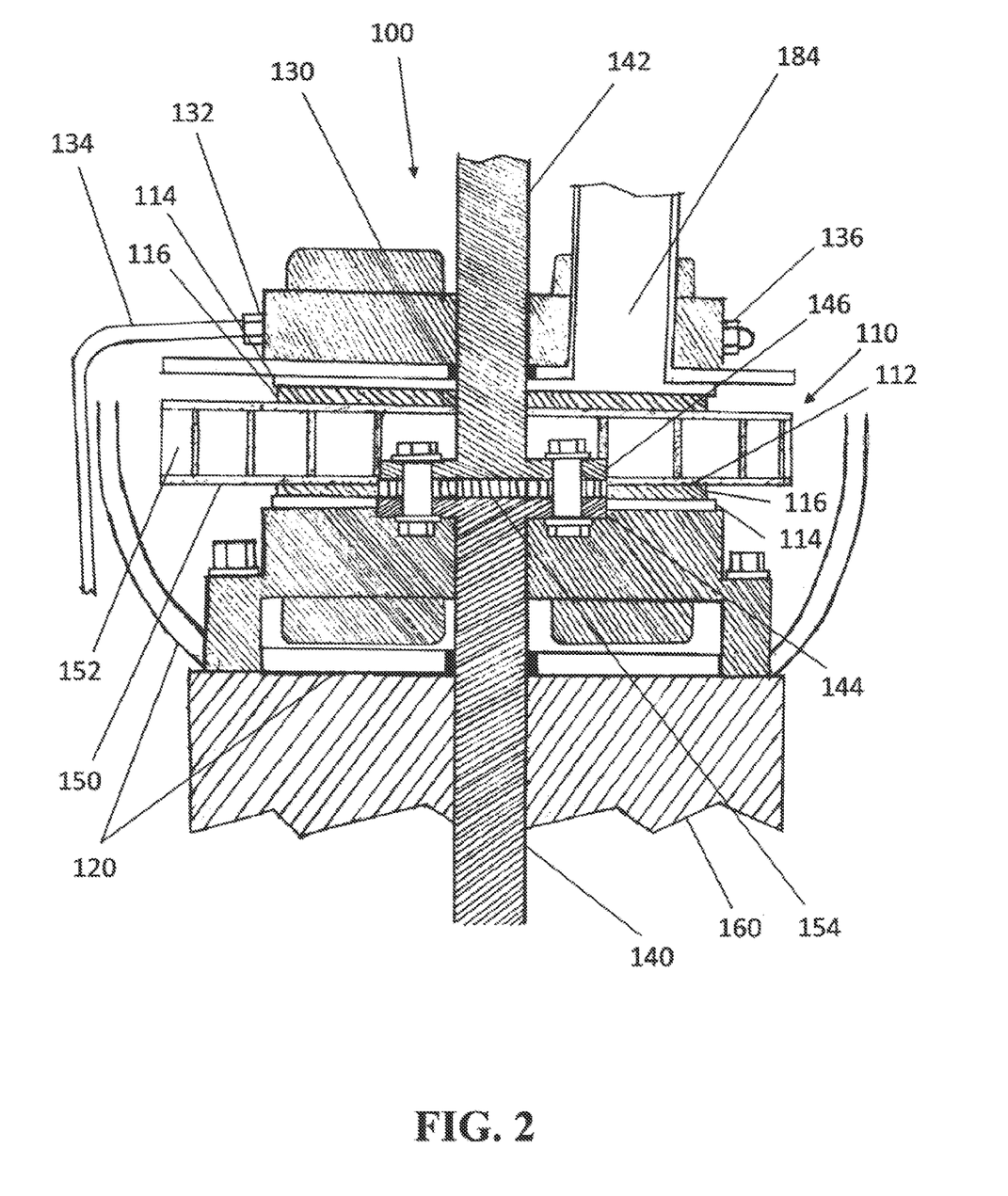
FIG. 2 is a partial cross-sectional view of the inboard brake system of FIG. 1 according to one embodiment.

Turning to FIG. 2, a partial cross-sectional view of the inboard brake system 100 of FIG. 1 is illustrated. FIG. 2 shows inboard brake system 100 comprising brake assembly 110, brake assembly enclosure 120 and an air-cooling system. Brake assembly 110 of this embodiment is a disk brake assembly. Brake assembly 110 is enclosed by brake assembly enclosure 120.

Brake assembly 110 of this embodiment comprises caliper 130 which houses brake pads 112, each having backing 114 and friction material 116. Caliper 130 of this embodiment is hydraulically powered. Hydraulic fluid reservoir, which houses the piston (not shown) and has a hydraulic fluid line input 132, which extends from a surface of caliper 130. Hydraulic fluid line 134 is connected to hydraulic fluid line input 132. Fluid bleed nipple 136 is disposed about an opposite side of caliper 130 from hydraulic fluid line input 132.

Brake assembly 110 further comprises brake rotor 150 having ventilation channels 152.

In this embodiment, brake assembly 110 is mounted to a rotational member between first rotational member portion 140 and second rotational member portion 142. First rotational member portion 140 is an output shaft of differential 160. Second rotational member portion 142 is an inboard end of a drive shaft. Brake rotor hat 154 is mounted between flange 144 of first rotational member portion 140 and flange 146 of second rotational member portion 142.

Brake caliper 130 is actionable to move brake pads 112 into frictional contact with rotor 150 to brake the rotational member. This occurs when the pressure of brake fluid entering hydraulic fluid line input 132 increases, driving piston (not shown) to push brake pads 112 into frictional contact with rotor 150.

Brake assembly enclosure 120 defines air inlet 184 and air outlet 186 (pictured in FIG. 1). Air inlet 184 is in fluid connection with air intake 182 (pictured in FIG. 1). Air outlet 186 (pictured in FIG. 1) is in fluid connection with air vent 188 (pictured in FIG. 1).

In this way, it is contemplated that environmental air enters air-cooling system 180 through air intake 182 (pictured in FIG. 1) and is transmitted into brake assembly enclosure 120 through air inlet 184. The environmental air passes over brake assembly 110, then exits brake assembly enclosure 120 by way of air outlet 186 (pictured in FIG. 1) which is in fluid connection with air vent 188 (pictured in FIG. 1).

In some embodiments the fluid connection between air intake 182 (pictured in FIG. 1) and air inlet 184 is formed by ducting. Similarly, the fluid connection between air outlet 186 (pictured in FIG. 1) and air vent 188 (pictured in FIG. 1) is formed by ducting between air outlet 186 (pictured in FIG. 1) and air vent 188 (pictured in FIG. 1).

Figure 3:
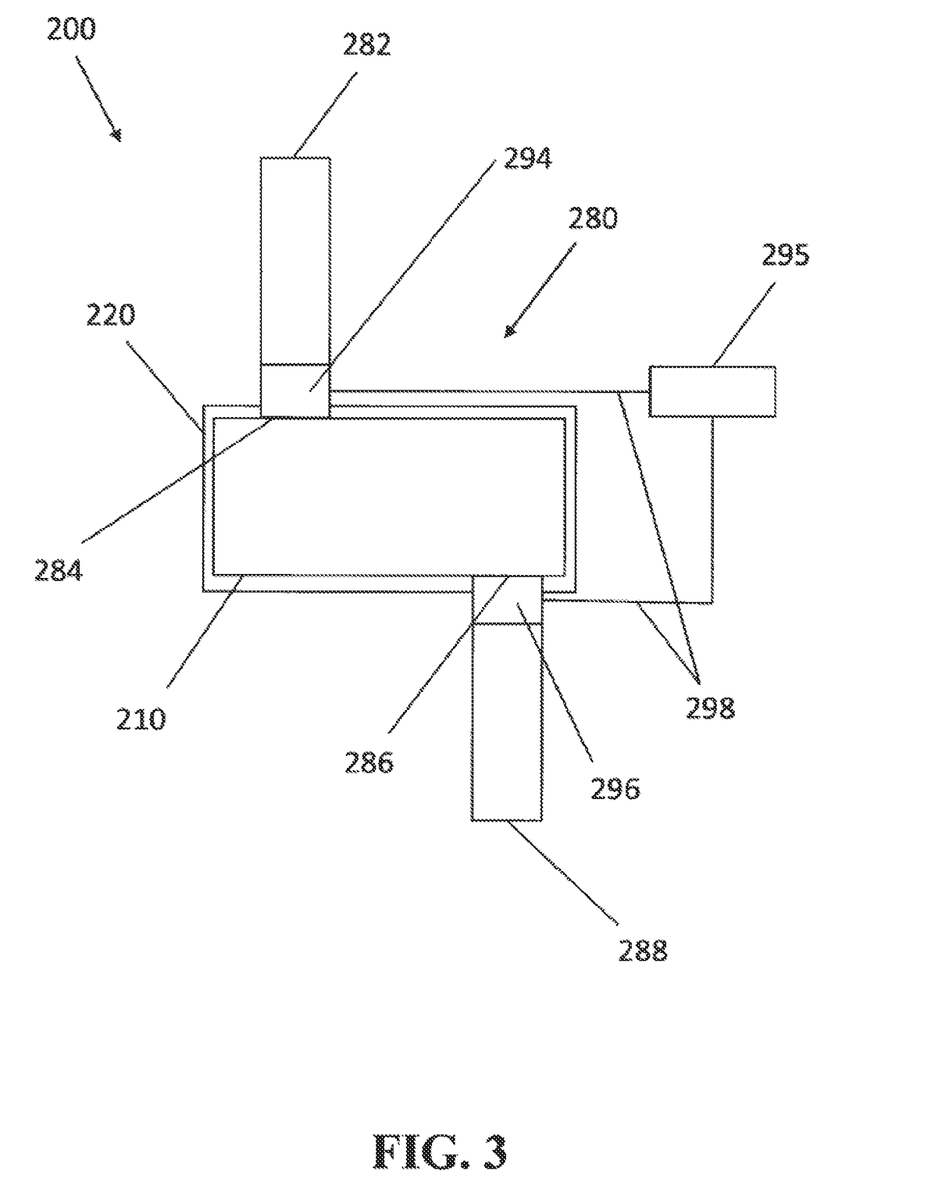
FIG. 3 is a diagram of an inboard brake system having controllable valves according to one embodiment.

Turning to FIG. 3, a diagram of inboard brake system 200 is illustrated according to one embodiment. Inboard brake system 200 comprises air-cooling system 280 and brake assembly 210, which is enclosed by brake assembly enclosure 220.

Air-cooling system 280 further comprises air intake 282, air inlet 284 of brake assembly enclosure 220, air outlet 286 of brake assembly enclosure 220, and air vent 288. Air intake 282 is disposed at a high-pressure region of a body of a vehicle. Air vent 288 is disposed at a low-pressure area of a body.

In this embodiment, first controllable valve 294 controls airflow through air inlet 284 and second controllable valve 296 controls airflow through air outlet 286. First controllable valve 294 and second controllable valve 296 are controlled by controller 295, which is in operable connection with first controllable valve 294 and second controllable valve 296. In this embodiment, controller 295 is a computer of the vehicle, and the operable connections to first controllable valve 294 and to second controllable valve 296 is accomplished by wires 298.

Figure 4:
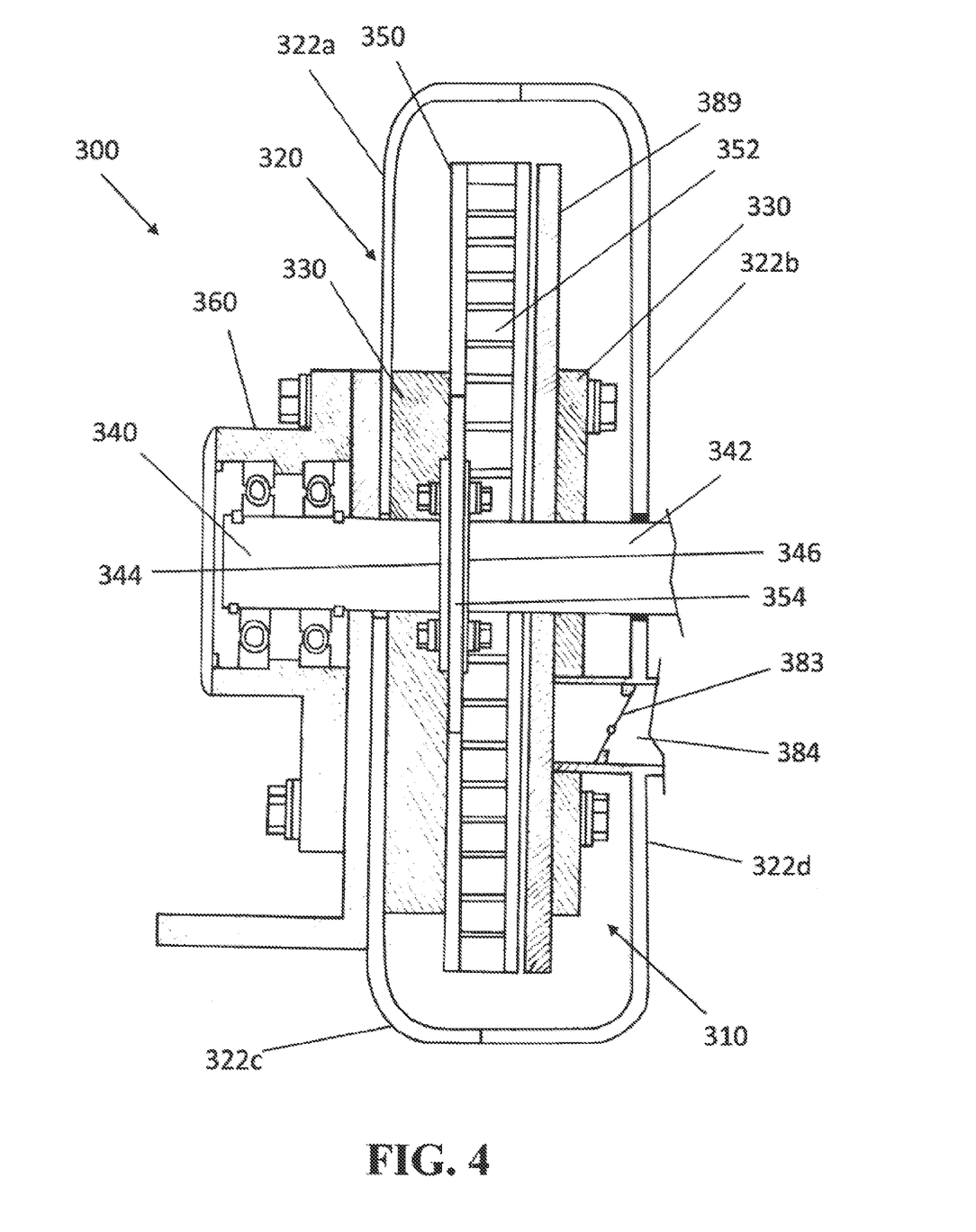
FIG. 4 is a partial cross-sectional view of an inboard brake system having optional controllable valves and optional diffuser according to one embodiment.

Turning to FIG. 4, a partial cross-sectional view of inboard brake system 300 is illustrated according to one embodiment.

FIG. 4 shows inboard brake system 300 comprising brake assembly 310, brake assembly enclosure 320 and an air-cooling system. Brake assembly 310 of this embodiment is a disk brake assembly. Brake assembly 310 is enclosed by brake assembly enclosure 320.

In this embodiment, brake assembly enclosure 320 comprises a first brake assembly enclosure section 322a, a second brake assembly enclosure section 322b, a third brake assembly enclosure section 322c, and a fourth brake assembly enclosure section 322d. The brake assembly enclosure sections 322a 322b 322c and 322d are joined to form the brake assembly enclosure 320.

Brake assembly 310 of this embodiment comprises caliper 330 which houses brake pads (not pictured).

Brake assembly 310 further comprises brake rotor 350 having ventilation channels 352.

In this embodiment, brake assembly 310 is mounted to a rotational member between first rotational member portion 340 and second rotational member portion 342. First rotational member portion 340 is a quasi-output shaft of quasi-differential 360. Second rotational member portion 342 is an inboard end of a driven shaft. Brake rotor hat 354 is mounted between flange 344 of first rotational member portion 340 and flange 346 of second rotational member portion 342.

Brake caliper 330 is actionable to move brake pads into frictional contact with brake rotor 350 to brake the rotational member.

Brake assembly enclosure 320 defines air inlet 384 and air outlet (not pictured). Air inlet 384 is in fluid connection with air intake (not pictured). Air outlet is in fluid connection with air vent (not pictured). Air diffuser 389 is disposed between air inlet 384 and the brake assembly 310.

In this way, it is contemplated that environmental air enters air-cooling system through air intake and is transmitted to air inlet 184 of brake assembly enclosure 320. The environmental air passes through and around diffuser 389, which improves the distribution of air through brake assembly 310. The air then exits brake assembly enclosure 320 by way of an air outlet (not pictured) which is in fluid connection with an air vent (not pictured).

It is contemplated that when brake assembly 310 is hotter than the environmental air, the air passing through brake assembly 310 will cool brake assembly. Conversely, it is contemplated that when the air passing through brake assembly 310 is hotter than brake assembly 310, the air will heat brake assembly 310.

In this embodiment, controllable valve 383 is fixed within air inlet 384. Controllable valve 383 of this embodiment is a throttle.

It will be appreciated that the present disclosure allows for brake assemblies of a vehicle to be mounted inboard in relation to the wheels, effectively moving the weight of the brake assemblies from the vehicle's unsprung weight to sprung weight. At the same time, the present disclosure allows for the heat of the brake assemblies to be managed while mounted in an inboard position.

The embodiments described herein are intended to be illustrative of the present compositions and methods and are not intended to limit the scope of the present invention. Various modifications and changes consistent with the description as a whole and which are readily apparent to the person of skill in the art are intended to be included. The appended claims should not be limited by the specific embodiments set forth in the examples but should be given the broadest interpretation consistent with the description as a whole.

What is claimed is:

1. An inboard braking system for a vehicle comprising:
    a brake assembly having an optimal braking temperature range;
    a brake assembly enclosure substantially enclosing the brake assembly and defining an air inlet and an air outlet; and
    an air-cooling system comprising
        one or more air intakes located at one or more high-pressure regions of a body of the vehicle in fluid connection with the air inlet of the brake assembly enclosure, and
        one or more air vents located at one or more low-pressure regions of the body of the vehicle in fluid connection with the air outlet of the brake assembly enclosure;
    wherein the air-cooling system and brake assembly enclosure form an airflow path through which air can flow from the one or more air intakes, through the brake assembly enclosure, to the one or more air vents.

2. The inboard braking system of claim 1, wherein the brake assembly is mounted to a rotational member.

3. The inboard braking system of claim 2, wherein the rotational member is an axle of the vehicle.

4. The inboard braking system of claim 2, wherein the brake assembly further comprises:
    at least one brake rotor fixed to the rotational member,
    at least one caliper corresponding to each of the at least one rotors, and
    at least one set of brake pads corresponding to each of the at least one calipers, each set of brake pads being housed within the corresponding one of the at least one calipers and the brake pads of the corresponding set of brake pads are disposed opposite one another on opposite sides of the corresponding one of the at least one brake rotors;
    wherein an action of each of the at least one calipers causes the corresponding one of the at least one sets of brake pads to engage the corresponding one of the at least one brake rotors in frictional contact.

5. The inboard braking system of claim 4, wherein the at least one brake rotors are at least one of vented, grooved, and drilled brake rotors.

6. The inboard braking system of claim 1, wherein the air intake is fluidly connected to the air inlet by a first ducting and the air outlet is fluidly connected to the air vent by a second ducting.

7. The inboard braking system of claim 1, wherein the air-cooling system further comprises an air diffuser disposed between the air inlet of the brake assembly enclosure and the brake assembly.

8. The inboard braking system of claim 1, further comprising an airflow control subsystem comprising one or more controllable valves and a valve controller adapted to control the one or more controllable valves.

9. The inboard braking system of claim 8, wherein the airflow control subsystem further comprises a temperature sensor in thermal communication with the brake assembly and in operable communication with the valve controller.

10. The inboard braking system of claim 8, wherein the valve controller controls the one or more controllable valves according to the temperature of the brake assembly and the optimal braking temperature range of the brake assembly.

11. The inboard braking system of claim 10, wherein the valve controller opens the one or more controllable valves when the temperature of the brake assembly is rising and is approximately the upper limit of the optimal braking temperature range of the brake assembly or hotter.

12. The inboard braking system of claim 10, wherein the valve controller closes the one or more controllable valves when the temperature of the brake assembly is cooling and is approximately the lower limit of the optimal braking temperature range of the brake assembly or colder.

13. The inboard braking system of claim 10, wherein the valve controller closes the one or more controllable valves when the temperature of the brake assembly is cooling and is approximately the upper limit of the optimal braking temperature range.

14. The inboard braking system of claim 10, wherein the valve controller is a bi-metal bar that is in thermal communication with the brake assembly and adapted to flex according to the temperature of the brake assembly, and the one or more controllable valves are controlled by a flexing action of the bi-metal bar.

15. The inboard braking system of claim 8, wherein the valve controller is a computer.

16. The inboard braking system of claim 15, wherein the valve controller is the computer adapted to open the one or more controllable valves when the computer predicts that the temperature of the brake assembly is rising and is likely to reach or exceed the upper limit of the optimal braking temperature range.

17. The inboard braking system of claim 15, wherein the valve controller is the computer adapted to close the one or more controllable valves when the computer predicts that the temperature of the brake assembly is cooling and will reach or fall below the lower limit of the optimal braking temperature range.

18. The inboard braking system of claim 15, wherein the valve controller is the computer adapted to close the one or more controllable valves when the computer predicts that the temperature of the brake assembly is cooling and is at approximately the upper limit of the optimal braking temperature.

19. The inboard brake system of claim 1, further comprising a brake heating subsystem comprising one or more heaters and a heater controller adapted to control the one or more heaters.

20. The inboard brake system of claim 19, further comprising a temperature sensor in thermal communication with the brake assembly and in operable communication with the heater controller.

21. The inboard braking system of claim 19, wherein the heater controller controls the one or more heaters according to the temperature of the brake assembly and the optimal braking temperature range of the brake assembly.

22. The inboard braking system of claim 21, wherein the heater controller activates the one or more heaters when the temperature of the brake assembly is at or below the lower limit of the optimal braking temperature range.

23. The inboard braking system of claim 21, wherein the heater controller is a bi-metal bar that is in thermal communication with the brake assembly and adapted to flex according to the temperature of the brake assembly, and wherein the one or more heaters are controlled by the flexing of the bi-metal bar.

24. The inboard braking system of claim 21, wherein the heater controller is a computer.

25. The inboard braking system of claim 24, wherein the heater controller is the computer adapted to activate the one or more heaters when the computer predicts that the temperature of the brake assembly will reach or fall below the lower limit of an optimal braking temperature range of the brake assembly.

26. The inboard braking system of claim 24, wherein the computer is adapted to receive sensor information, and further adapted to use the sensor information to predict a future temperature of the brake assembly.

27. The inboard brake system of claim 1, further comprising a forced air subsystem comprising one or more blowers and a blower controller adapted to control the one or more blowers.

28. The inboard brake system of claim 27, further comprising a temperature sensor in thermal communication with the brake assembly and in operable communication with the blower controller.

29. The inboard brake system of claim 27, further comprising an airflow sensor disposed along the airflow path of the air-cooling system and in operable communication with the blower controller.

30. The inboard braking system of claim 29, wherein the blower controller controls the one or more blowers in accordance with an airflow of the air-cooling system and the optimal braking temperature range of the brake assembly.

31. The inboard brake system of claim 29, wherein the airflow sensor is selected from the list of: a moving vane meter, a hot wire sensor, a cold wire sensor, a Kármán vortex sensor, and a membrane sensor.

32. The inboard braking system of claim 27, wherein the blower controller controls the one or more blowers in accordance with the temperature of the brake assembly and the optimal braking temperature range of the brake assembly.

33. The inboard brake system of claim 1, further comprising two or more of:
- an airflow control subsystem comprising one or more controllable valves and a valve controller;
- a forced air subsystem comprising one or more blowers and a blower controller; and
- a brake heating subsystem comprising one or more heaters and a heater controller; and
- a single master controller, the master controller being two or more of: the valve controller, the blower controller, and the heater controller; wherein the master controller is adapted to control the two or more subsystems to maintain a temperature of the brake assembly within an optimal braking temperature range.

34. The inboard brake system of claim 33, wherein the master controller is a computer.

35. The inboard brake system of claim 34, wherein the master controller is a bi-metal bar in thermal communication with the brake assembly such that the bi-metal bar flexes according to the temperature of the brake assembly, and wherein the flexing action of the bi-metal bar controls the two or more subsystems.

36. The inboard brake system of claim 35, wherein the bi-metal bar is adapted to actuate one or more switches which are each in operable connection with one or more of the two or more subsystems.

* * * * *